(12) United States Patent
Cormier et al.

(10) Patent No.: US 9,290,895 B2
(45) Date of Patent: Mar. 22, 2016

(54) CORRUGATED METAL PLATE ASSEMBLY SYSTEM AND METHOD

(71) Applicants: Timothy J. Cormier, Cincinnati, OH (US); Darrell J. Sanders, Mason, OH (US)

(72) Inventors: Timothy J. Cormier, Cincinnati, OH (US); Darrell J. Sanders, Mason, OH (US)

(73) Assignee: CONTECH ENGINEERED SOLUTIONS LLC, West Chester, OH (US)

( * ) Notice: Subject to any disclaimer, the term of this patent is extended or adjusted under 35 U.S.C. 154(b) by 266 days.

(21) Appl. No.: 14/031,524

(22) Filed: Sep. 19, 2013

(65) Prior Publication Data

US 2015/0075664 A1   Mar. 19, 2015

(51) Int. Cl.
| | |
|---|---|
| *F16L 11/00* | (2006.01) |
| *F16L 9/00* | (2006.01) |
| *E21D 11/00* | (2006.01) |
| *E01F 5/00* | (2006.01) |
| *F16L 9/06* | (2006.01) |
| *F16L 9/22* | (2006.01) |
| *F16L 11/18* | (2006.01) |
| *B21D 51/12* | (2006.01) |

(52) U.S. Cl.
CPC ............... *E01F 5/005* (2013.01); *F16L 9/003* (2013.01); *F16L 9/006* (2013.01); *F16L 9/06* (2013.01); *F16L 9/22* (2013.01); *F16L 11/18* (2013.01); *B21D 51/12* (2013.01); *Y10T 29/49947* (2015.01)

(58) Field of Classification Search
CPC ........... E01F 5/005; F16L 11/18; F16L 9/003; F16L 9/006; F16L 9/06; F16L 9/22
USPC ................... 138/121, 157–167, 173; 405/152
See application file for complete search history.

(56) References Cited

U.S. PATENT DOCUMENTS

| | | | | |
|---|---|---|---|---|
| 76,088 | A * | 3/1868 | Ligon | B63B 3/16 114/84 |
| 300,469 | A * | 6/1884 | Haskin | E21D 9/005 405/138 |
| 400,566 | A * | 4/1889 | Harry | 220/611 |
| 558,436 | A * | 4/1896 | Thomas | 405/153 |
| 973,503 | A | 10/1910 | Harry | |
| 984,337 | A * | 2/1911 | Woodworth | 405/153 |
| 1,083,548 | A | 1/1914 | Martin | |
| 1,259,232 | A | 3/1918 | Hartman | |
| 1,806,920 | A * | 5/1931 | See | 427/234 |
| 1,952,217 | A | 3/1934 | Patton et al. | |
| 2,002,987 | A * | 5/1935 | Schulz | E21D 11/15 138/100 |

(Continued)

*Primary Examiner* — Patrick F Brinson
*Assistant Examiner* — Matthew Lembo
(74) *Attorney, Agent, or Firm* — Thompson Hine LLP

(57) ABSTRACT

A corrugated plate structure including a plurality of first rows of members, each first row including a first plurality of members connected end-to-end lengthwise. Each first row has members of variable widths along its length to define a first edge, and the first edge is similarly shaped for each first row. The corrugated plate structure further includes a plurality of second rows of members, each second row including a second plurality of members connected end-to-end lengthwise. Each second row has members of variable widths along its length to define a second edge, and the second edge is similarly shaped for each second row. The first edge and the second edge are complementary in shape, and the first rows and second rows are connected side-by-side along their first and second edges, where each member of the first row is interconnected with one member of the second row.

17 Claims, 9 Drawing Sheets

(56) References Cited

U.S. PATENT DOCUMENTS

| | | | |
|---|---|---|---|
| 2,017,058 A | 10/1935 | Freeze | |
| 2,065,368 A | 12/1936 | Freeze | |
| 2,148,783 A * | 2/1939 | Spaulding | 405/147 |
| 2,181,508 A * | 11/1939 | Cushwa | E21D 11/15 405/153 |
| 2,217,292 A * | 10/1940 | Proctor | E21D 11/15 29/897.3 |
| 2,358,960 A * | 9/1944 | Cleve | 29/525.06 |
| 2,536,759 A * | 1/1951 | Martin et al. | 405/153 |
| 2,746,090 A * | 5/1956 | Hoover | 264/269 |
| 3,638,434 A * | 2/1972 | Delaere | 405/126 |
| 4,252,464 A * | 2/1981 | Habib | E21D 11/22 403/2 |
| 4,497,590 A * | 2/1985 | Chase | E21D 11/08 405/152 |
| 4,512,596 A | 4/1985 | Obrecht | |
| 5,056,834 A | 10/1991 | Scott et al. | |
| 5,295,764 A * | 3/1994 | Cunat | 405/151 |
| 7,793,994 B2 | 9/2010 | Boyd | |
| 8,056,938 B2 | 11/2011 | Shen et al. | |
| 2011/0129300 A1* | 6/2011 | Dimillo | 405/152 |
| 2014/0086686 A1* | 3/2014 | Sanders | 405/152 |

* cited by examiner

CORRUGATED METAL PLATE ASSEMBLY SYSTEM AND METHOD

TECHNICAL FIELD

The present application relates to corrugated structures, and more specifically, to corrugated metal plate structures and methods of manufacturing the same.

BACKGROUND

Corrugated metal plate is commonly used in the civil engineering field and construction field to produce structures having desired strength characteristics. For example, corrugated metal plate is commonly used to create tubular structures (e.g., round or elliptical pipe) and arch-shaped structures (e.g., semi-circular or half-ellipse culverts). Typically, the structures are formed using corrugated metal plate members, all of which have the same width, connected end-to-end and side-by-side.

This typical configuration results in structures where some portions of the plate members overlap to form seams that are three to four plates thick. For example, if the plate members are not staggered, then the seam is four plates thick at corner junctions where four plate members meet. Or, if the plate members are staggered in break-joint fashion, then the seam is three plates thick along T-shaped joints where the sides of two plate members joined end-to-end meet a third plate member.

When two corrugated metal plates with uniform-sized corrugations are stacked together along a seam in a plate structure, they tend to nest imperfectly as opposed to forming a neat seam, which can make assembly difficult because prefabricated holes in the plate members designed to receive bolts, rivets, or other connectors to secure the seam will often not align properly. These consequences of imperfect nesting are magnified along seams with three to four plate "pile-ups." This leads to extra work in the field to drill new holes or make other accommodations to assemble the structure. The pile-ups also create irregularities in the general shape of the structure and constitute a waste of material along the seams. Efforts to avoid these problems and improve alignment through higher tolerance control and more precise manufacturing methods add extra time and/or cost to the manufacturing and assembly process.

SUMMARY

In one aspect, a plate structure is disclosed, the plate structure including a plurality of first plate members each having lengthwise first and second sides and widthwise first and second ends, each of the plurality of first plate members having a common substantially uniform first width. The plate structure further includes a plurality of second plate members each having lengthwise first and second sides and widthwise first and second ends, each of the plurality of second plate members having a common substantially uniform second width, such that the second width is larger than the first width. The plurality of first plate members and the plurality of second plate members are interconnected with each other such that the resultant plate structure has a plurality of first rows formed by first plate members and second plate members connected end-to-end in an alternating manner, as well as a plurality of second rows formed by first plate members and second plate members connected end-to-end in an alternating manner, where the first rows and second rows are connected side-by-side in an alternating manner. The sides of the first plate members of the first rows are connected to the sides of the second plate members of the second rows, and the sides of the second plate members of the first rows are connected to the sides of the first plate members of the second rows.

In accordance with another aspect, a corrugated plate structure is disclosed, the corrugated plate structure including a plurality of first rows of corrugated plate members, each first row including a first plurality of corrugated plate members connected end-to-end lengthwise. Each first row has corrugated plate members of variable widths along its length to define a first edge, and the first edge is similarly shaped for each first row. The corrugated plate structure further includes a plurality of second rows of corrugated plate members, each second row including a second plurality of corrugated plate members connected end-to-end lengthwise. Each second row has corrugated plate members of variable widths along its length to define a second edge, and the second edge is similarly shaped for each second row. The first edge and the second edge are complementary in shape, and the first rows and second rows are connected side-by-side along their first and second edges, where each of the corrugated plate members of the first plurality of corrugated plate members of the first row is interconnected with one of the corrugated plate members of the second plurality of corrugated plate members of the second row.

In yet another aspect, a method of manufacturing a plate structure is disclosed, the method including providing a plurality of first plate members each having lengthwise first and second sides and widthwise first and second ends, each of the plurality of first plate members having a common substantially uniform first width, and providing a plurality of second plate members each having lengthwise first and second sides and widthwise first and second ends, each of the plurality of second plate members having a common substantially uniform second width, where the second width is larger than the first width. The method further involves connecting the plurality of first plate members and the plurality of second plate members end-to-end in an alternating manner to form a plurality of first rows and a plurality of second rows and connecting the plurality of first rows and the plurality of second rows side-by-side in an alternating manner. The sides of the first plate members of the first rows are connected to the sides of the second plate members of the second rows, and the sides of the second plate members of the first rows are connected to the sides of the first plate members of the second rows to form the plate structure.

Other aspects of the disclosed structure and method will become apparent from the following description, the accompanying drawings, and the appended claims.

DETAILED DESCRIPTION

Figure 1:
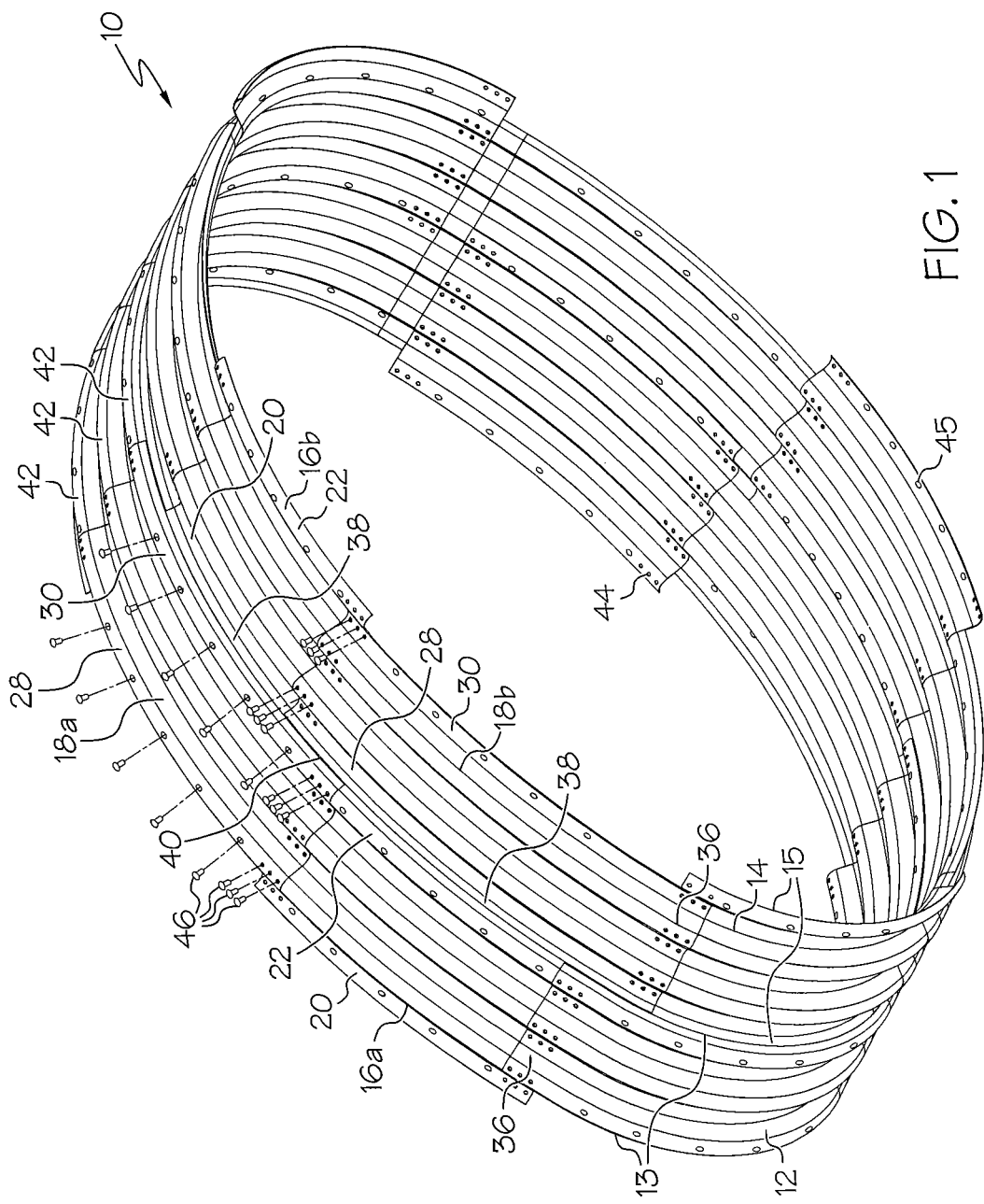
FIG. 1 is a perspective view of two complementary rows of corrugated plate members joined to form one embodiment of a corrugated plate structure.

The following detailed description will illustrate the general principles of the invention, examples of which are additionally illustrated in the accompanying drawings. In the drawings, like reference numbers indicate identical or functionally similar elements.

Figure 2:
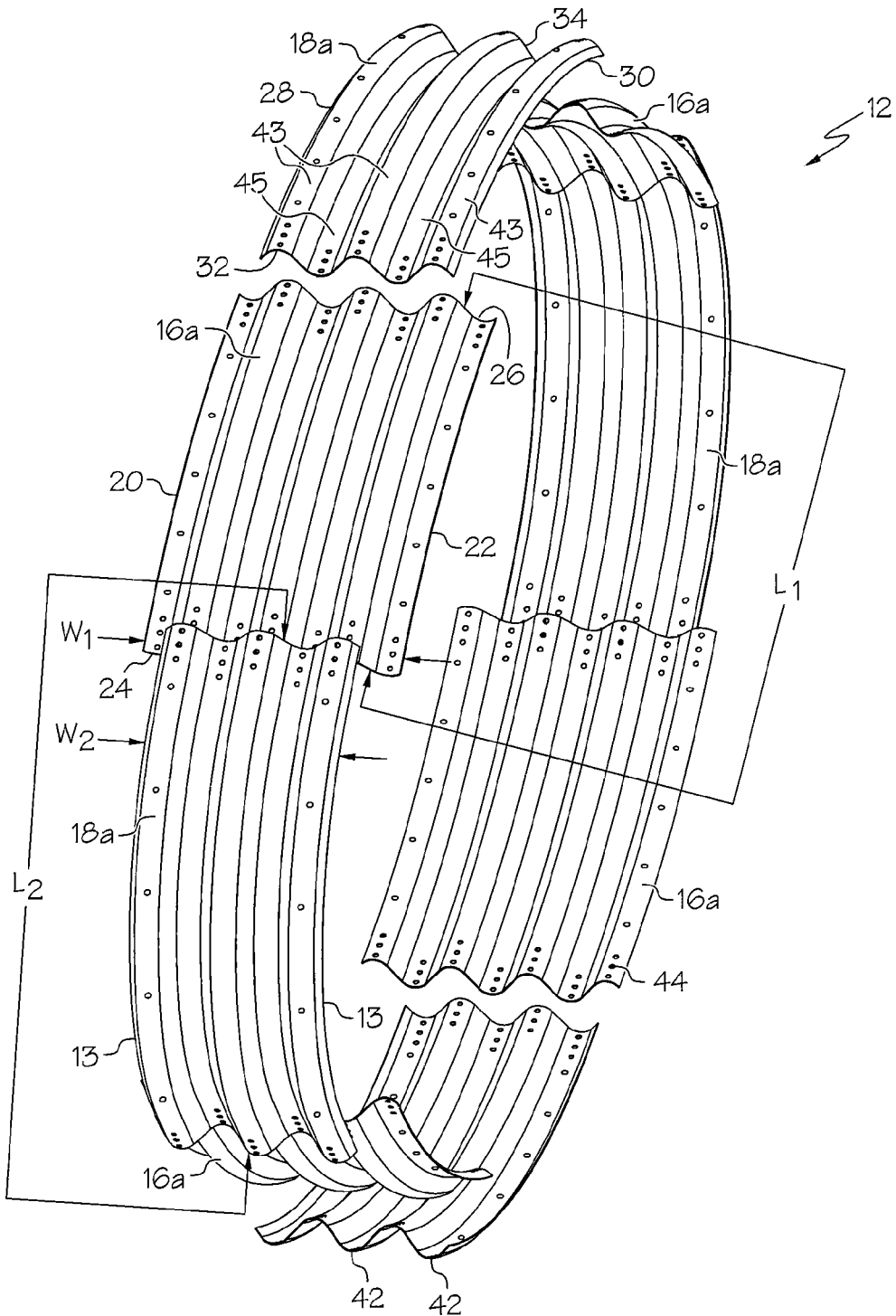
FIG. 2 shows the plate members forming the first row of FIG. 1.
Figure 3:
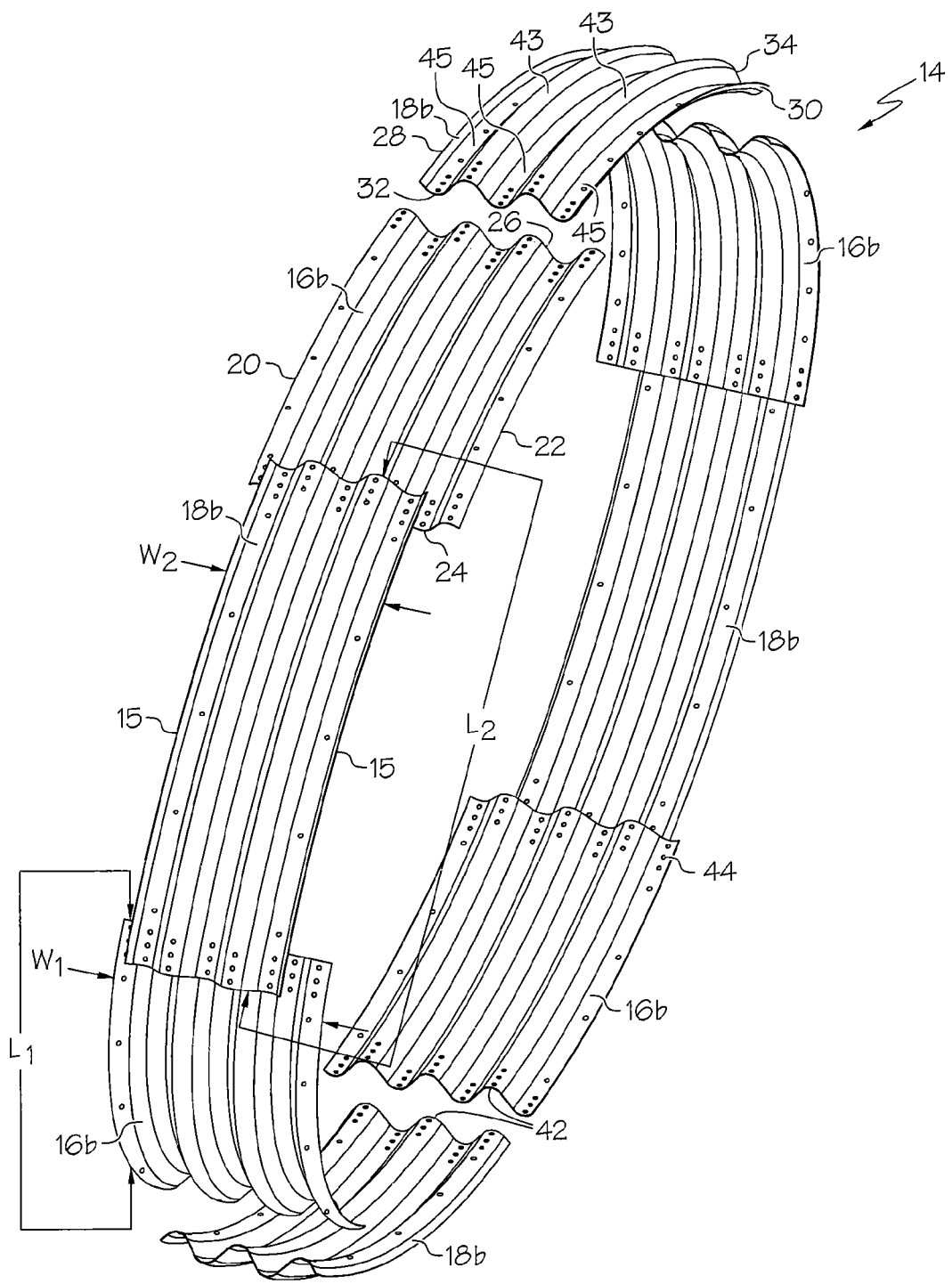
FIG. 3 shows the plate members forming the second row of FIG. 1.

Referring now to FIGS. 1-3, a plate structure, generally designated 10, is formed of a plurality of alternating first and second rows 12, 14. The plate structure 10 may have any number of rows 12, 14, arranged side-by-side, as necessary to create a structure of any desired size. Plate structure 10 may be a culvert, a pipe, a sewer, a drain, an underpass, a canal, an arched span, and the like.

Each row 12, 14 is formed of a plurality of alternating plate members 16, 18. In the figures, plate members 16, 18 of first row 12 are designated 16a, 18a, and plate members 16, 18 of second row 14 are designated 16b, 18b. Each plate member 16 has lengthwise sides 20, 22 and widthwise ends 24, 26. Similarly, each plate member 18 has lengthwise sides 28, 30 and widthwise ends 32, 34. In one embodiment, each plate member 16, 18 is generally rectangular in shape. Rows 12, 14 are thus formed by connecting a chain of a plurality of plate members 16, 18 such that the end 24 of one plate member 16 connects with the end 34 of a neighboring plate member 18, and the end 32 of that neighboring plate member 18 connects with the end 26 of an additional plate member 16, which in turn is similarly connected with an additional plate member 18. Plate members 16 and plate members 18 within a row 12, 14 are joined along widthwise seams 36.

Rows 12, 14 may include any number of plate members 16, 18, as necessary to form rows of the desired length, and rows 12, 14 may be formed into any cross-sectional shape suitable for the intended purpose of the plate structure 10. In one embodiment, rows 12, 14 form generally elliptical rings, and each row 12, 14 includes eight total plate members (four plate members 16 and four plate members 18). Alternately, rows 12, 14 may be arranged in a flat configuration (as shown in FIG. 7) or in any of a variety of curved, angled, or closed-ring configurations such as (but not limited to) those shown in FIGS. 8A-8J.

Plate members 16 and plate members 18 have different widths, such that a width $W_1$ of each plate member 16 is greater than a width $W_2$ of each plate member 18 (so ends 24, 26 are wider than ends 32, 34). Plate members 16, 18 may additionally have different lengths, where a length $L_1$ of each plate member 16 is less than a length $L_2$ of each plate member 18 (so sides 28, 30 are longer than sides 20, 22). Width $W_1$ and length $L_1$ may be the same for each plate member 16, and width $W_2$ and length $L_2$ may be the same for each plate member 18, but it is contemplated that in some structures plate members of the same width could have different lengths (e.g., plate members 16 incorporated into a given row may not all be of the same length, or plate members 18 incorporated into a given row may not all be of the same length). In one embodiment, the plate members 16, 18 are arranged to form rows 12, 14 such that ends 24, 26 are uniformly centered along the wider ends 32, 34 such that the resultant rows 12, 14 form a symmetrical staggered or stepped profile along both edges 13, 15 of each of the rows 12, 14.

Figure 6:
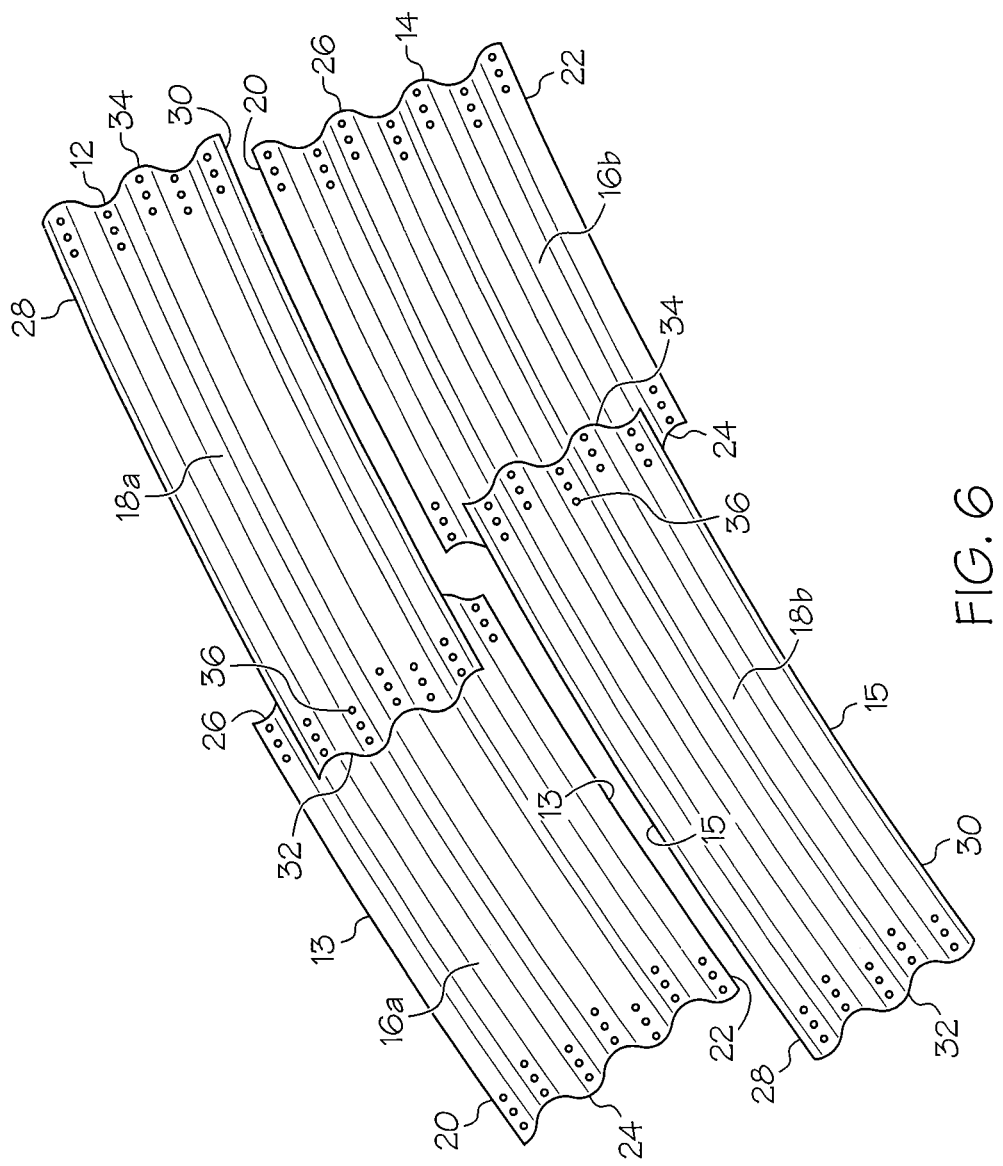
FIG. 6 is a detailed view of a portion of each of the rows of FIG. 1 just prior to connection.
Figure 7:
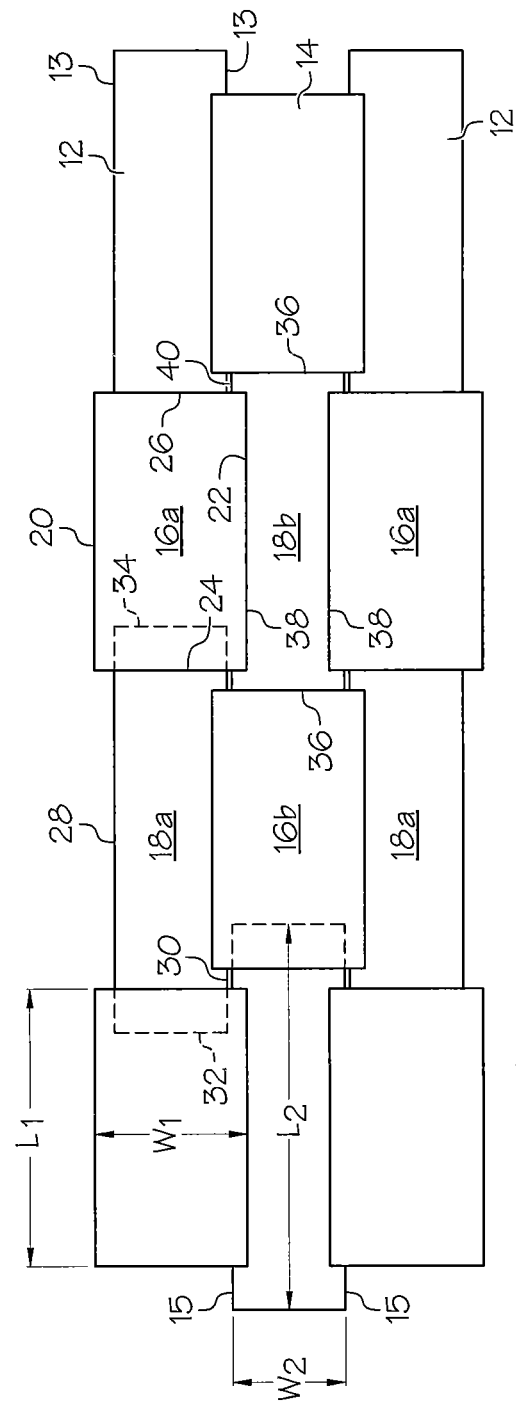
FIG. 7 is a schematic view of three rows of corrugated plate members in a flat configuration.
Figure 8A:
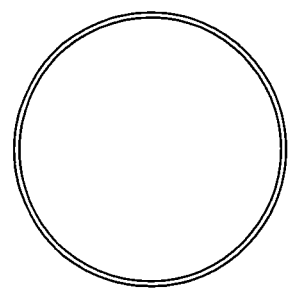
FIGS. 8A-8J show exemplary alternative shapes for the first and second rows of the corrugated plate structure.
Figure 8B:
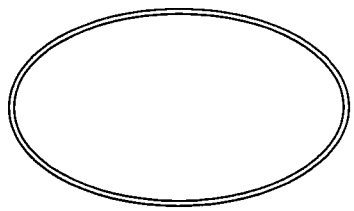
Figure 8C:
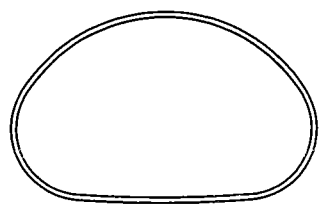
Figure 8D:
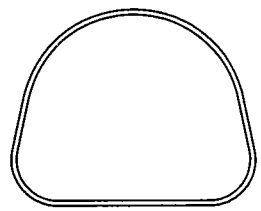
Figure 8E:
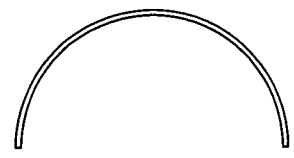
Figure 8F:
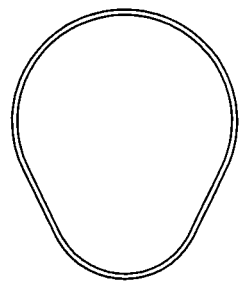
Figure 8G:
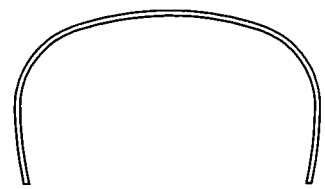
Figure 8H:
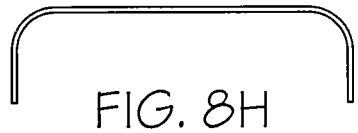
Figure 8I:
Figure 8J:
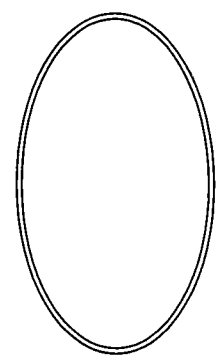

As best seen in FIGS. 1, 6, and 7, to form the plate structure 10, rows 12, 14 are connected side-by-side in an alternating manner, where plate members 16a of row 12 connect in complementary fashion with plate members 18b of row 14, and plate members 18a of row 12 connect in complementary fashion with plate members 16b of row 14. These connections are effected along the plate members' respective lengthwise sides to form a plurality of lengthwise seams 38 along the junction between the two rows 12, 14, where sides 22 of plate members 16 connect with sides 28 of plate members 18, and sides 20 of plate members 16 connect with sides 30 of plate members 18.

The various plate members 16, 18 of plate structure 10 are therefore connected only along widthwise seams 36 (to form rows 12, 14) and lengthwise seams 38 (to connect rows 12, 14 together). As best seen in FIG. 7, each plate member 16 (excluding those along edge areas of the plate structure 10) is connected with four plate members 18, and each plate member 18 (excluding those on the outer edge areas of the plate structure 10) is connected with four plate members 16, where each connection is formed along a single seam 36, 38. Because of the relationship between the lengths $L_1$, $L_2$, and particularly due to the use of different widths $W_1$, $W_2$ of the plate members 16, 18, there are no direct connections between any two plate members 16 or any two plate members 18 within a single row 12, 14 or across two rows 12, 14. By virtue of this connection scheme, seams 36, 38 are never more than two plates thick, thus eliminating the problems associated with three and four-plate pile-ups by avoiding any junction of three or more plates.

As a further consequence of this structure, a plurality of gaps 40 may be present in plate structure 10 (best seen in FIG. 7). The size and shape of the gaps 40 are a function of the variance in size (i.e. $L_1$ vs $L_2$ and $W_1$ vs $W_2$) of the respective plate members 16, 18, where the greater the size differential, the larger the gap 40. In one embodiment, gaps 40 are soil-tight, but water-permeable, thus facilitating drainage of water or other liquids out of plate structure 10. In another embodiment gaps 40 may be filled with plugs (not shown) or otherwise sealed to form a water-tight plate structure 10. Alternately, plate members 16, 18 may have varying widths $W_1$, $W_2$ as earlier described, but uniform lengths, thus eliminating or minimizing gaps 40 because plate members 16a, 16b of neighboring rings would abut each other near their corners. Gaps 40 can thus be eliminated by adjusting the lengths $L_1$, $L_2$ and/or widths $W_1$, $W_2$ of plate members 16, 18 to close the area that would otherwise define gaps 40, or gaps 40 may be left intact if more permeable conditions are acceptable given a particular use for plate structure 10.

Plate members 16, 18 may include multiple corrugations 42 therein to form a corrugated plate structure 10. Plate members 16, 18 may have any number of corrugations of any size and shape, including round, trapezoidal, and the like. In an embodiment with corrugated plate members 16, 18 where the plate structure 10 is curved (e.g., elliptical, semi-circular, etc.), the respective plate members 16a, 16b and plate members 18a, 18b of first and second rows 12, 14 that are otherwise of the same type are oppositely curved (relative to an uncurved corrugated plate with the same corrugation scheme) depending upon the row to which the plate member 16, 18 belongs. This preserves the corrugated structure when rows 12, 14 are joined together and ensures complementary attachment throughout plate structure 10. To illustrate, compare plate member 18a of row 12 (FIG. 2) with plate member 18b of row 14 (FIG. 3). In the depicted embodiment, each plate member 18*a* has three outwardly-oriented/protruding corrugations 43 and two inwardly-oriented/protruding corrugations 45. Conversely, each plate member 18*b* has two outwardly-oriented corrugations 43 and three inwardly-oriented corrugations 45. Thus, while both plate members 18*a* and 18*b* are the same size and have the same total number of corrugations, they are nonetheless distinct such that plate member 18*b* is incompatible for use in first row 12, and plate member 18*a* is incompatible for use in second row 14. The same relationship exists between first plate members 16*a*, 16*b*. Put another way, in row 12 (FIG. 2), both sides 20, 22 of each plate member 16*a* have outward orientations (i.e. they curl radially outward away from the center of the row), and both sides 28, 30 of each plate member 18*a* have inward orientations (i.e. they curl radially inward toward the center of the row). The opposite is true for row 14 (FIG. 3), where both sides 20, 22, of each plate member 16*b* have inward orientations and both sides 28, 30, of each plate member 18*b* have outward orientations.

Figure 9:
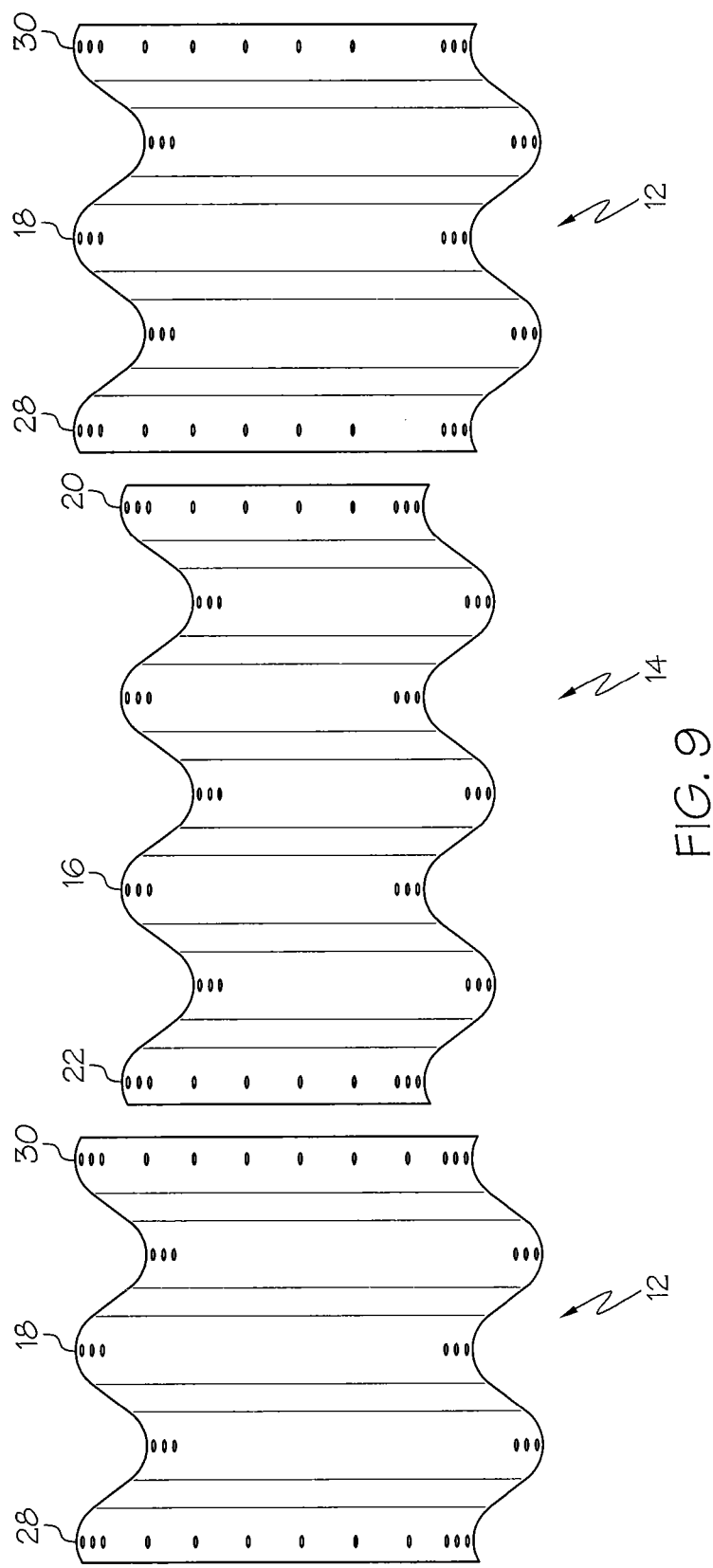
FIG. 9 shows the corrugation profile of the plates from three rows of a corrugated plate structure according to the embodiment of FIG. 1.
Figure 10:
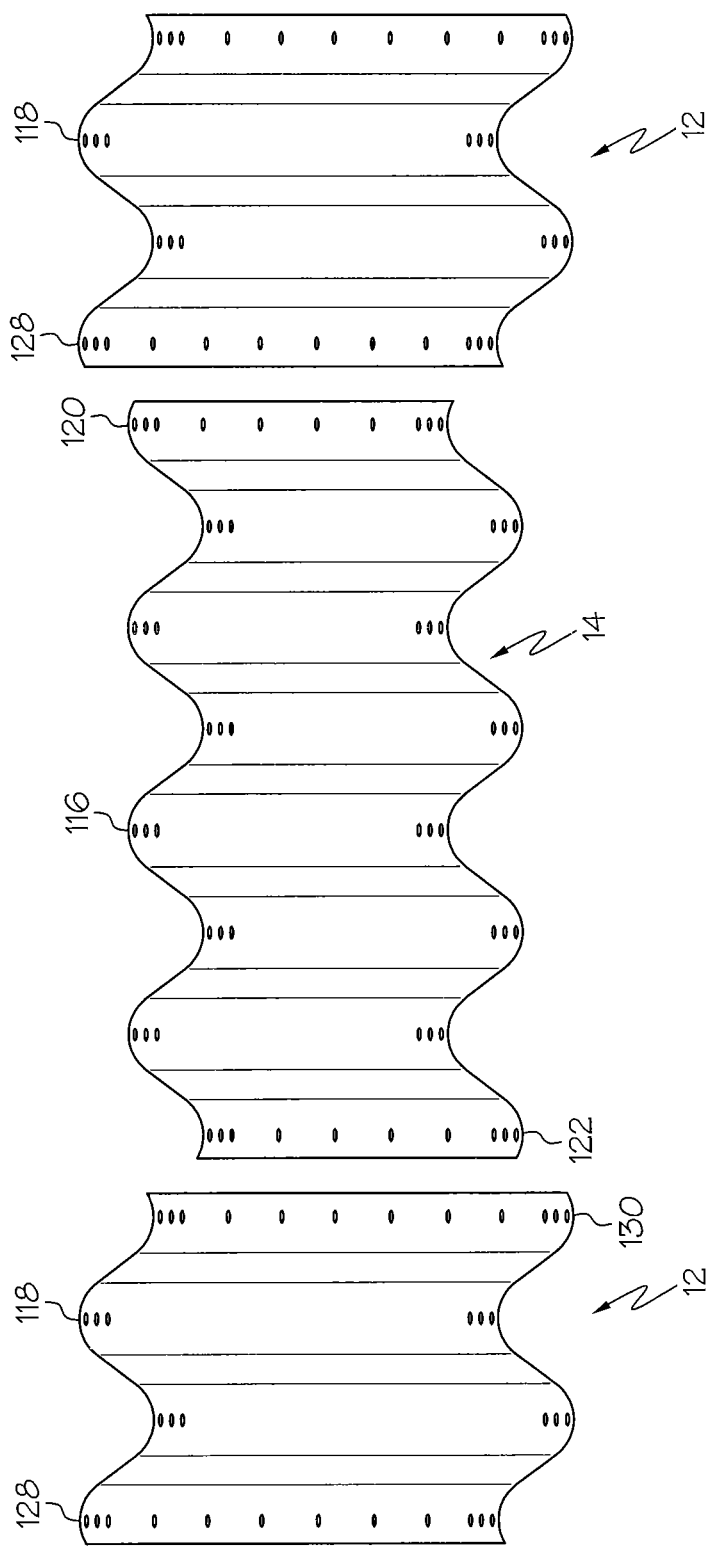
FIG. 10 shows the corrugation profile of the plates from three rows of another embodiment of a corrugated plate structure.

Referring now to FIGS. 9 and 10, the corrugation profiles of the plates 16, 18 are shown for two embodiments of the plate structure 10. The three plates in each figure are located in different rows 12, 14 of the plate structure 10. FIG. 9 depicts the same embodiment of plates 16, 18 shown in FIGS. 1-7. In this embodiment, the connections between each plate 16 and the neighboring two plates 18 from the neighboring rows are either both on upswings (i.e. curling radially outward from the center of the row, when bent) or both on downswings (i.e. curling radially inward toward the center of the row, when bent) of the corrugation profile. In the alternate embodiment of FIG. 10, each plate 116, 118 is formed with an upswing on one side and a downswing on the opposite side. Thus, for the depicted plate 116, side 128 of plate 118 and side 120 of plate 116 are joined on an upswing, but side 130 of plate 118 and side 122 of plate 116 are joined on a downswing. One benefit of the embodiment of FIG. 9 is that the plates 16, 18 are each symmetrical across a central axis, so when constructing rows 12, 14, plates 18 may be centered along plates 16 for ease of construction (see FIG. 6). One benefit of the embodiment of FIG. 10 is that the plates 16, 18 are rotationally symmetrical, which, depending upon the desired shape of plate structure 10, may increase compatibility of plates 16, 18 between rows 12, 14.

Figure 4:
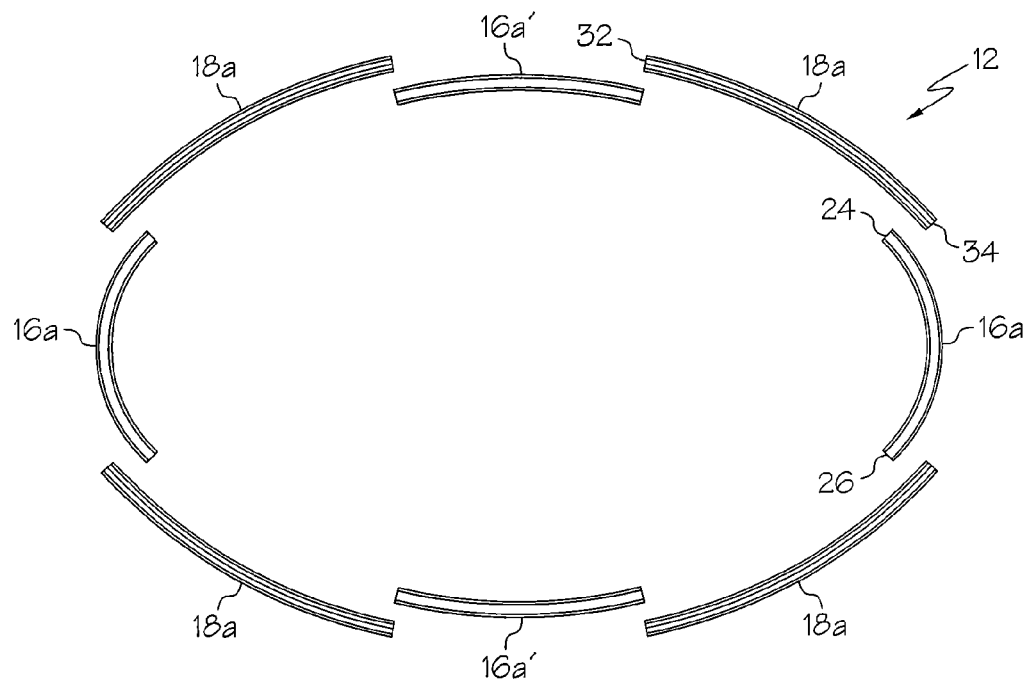
FIG. 4 shows the cross-section of the arranged, but unconnected, plate members of FIG. 2.
Figure 5:
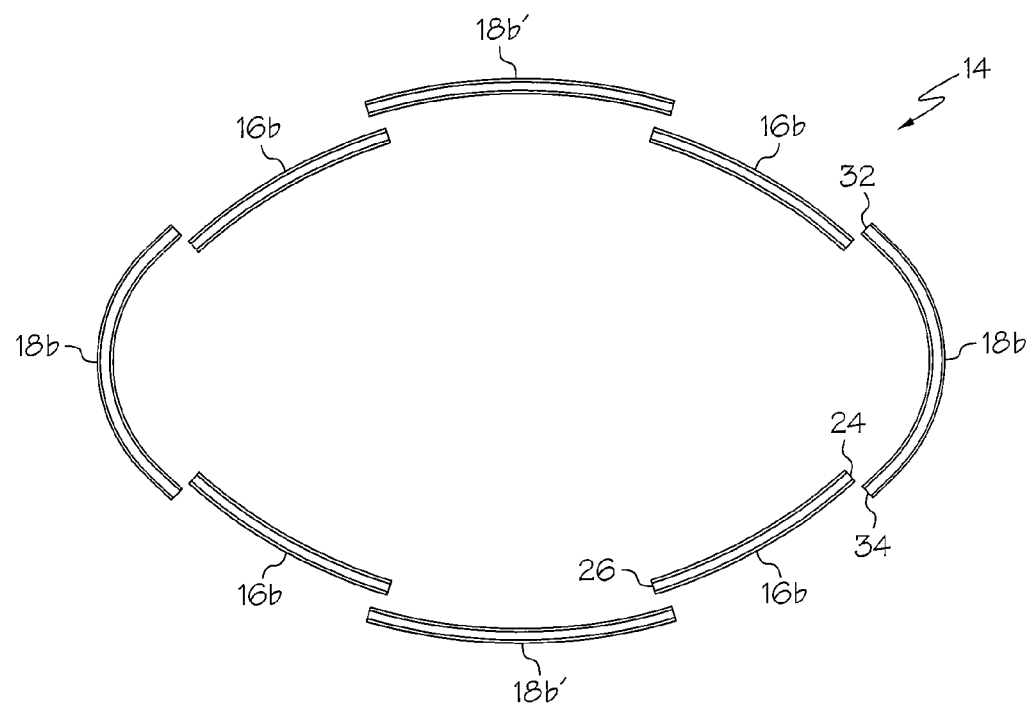
FIG. 5 shows the cross-section of the arranged, but unconnected, plate members of FIG. 3.

Depending upon the desired shape of the plate structure 10, plate members 16, 18 of the same type may also vary within the same row 12, 14 in addition to the above-described variations between rows. FIGS. 4 and 5 show cross-sectional views of rows 12 and 14 and exemplify this concept with respect to the generally elliptical shape of the depicted embodiment. In row 12 (FIG. 4), each of the four plate members 18*a* are identical. However, due to the different radii of curvature between the major and minor axes, two distinct forms of the plate member 16*a*, 16*a*' are required to establish the elliptical structure. Similarly, in row 14 (FIG. 5), each of the four plate members 16*b* are identical, but there are two distinct forms of plate member 18*b*, 18*b*'. Thus, to form the plate structure 10 of FIG. 1, six distinct plate member types are required: 16*a*, 16*a*', 18*a*, 16*b*, 18*b*, and 18*b*'. Further, special forms of plate members 16, 18 may be used for rows that define end portions (not shown) of the plate structure 10 to provide even outer-most edges without a stepped appearance or with a different shape to provide a more finished look or to facilitate connection to another type of structure (not shown).

Plate members 16, 18 may be joined to form seams 36, 38 by any mechanism known to those in the art, including but not limited to mechanical fasteners (such as screws, rivets, bolts, pins, etc.), ties, adhesives, welds, or snap-fit features. In one embodiment, plate members 16, 18 have a plurality of holes 44 along their ends 24, 26, 32, 34 and a plurality of holes 45 along their sides 20, 22, 28, 30, and corresponding plate members 16, 18 overlap with their respective holes 44, 45 aligned to receive bolts 46 therethrough (depicted schematically in FIG. 1). Holes 44 and holes 45 may be identical in structure and differ only in location along plate members 16, 18, and they may be threaded. Holes 44, 45 may be prefabricated within plate members 16, 18, for example using a plasma table, or holes 44 may be drilled as needed during assembly of the rows 12, 14 and plate structure 10. Plate members 16, 18 may overlap in any number of ways. For example, all plate members 18 may be positioned on the outside to overlap plate members 16, all plate members 16 may be positioned on the outside to overlap plate members 18, or different seams 36, 38 may have different overlapping schemes.

Plate members 16, 18 may be made of steel or any other metal/metal alloy, suitable for the particular purpose of plate structure 10, or plate members 16, 18 may be formed of a polymer or other appropriate material. Plate members 16, 18 may further have a coating of zinc (i.e. galvanized), aluminum, polymer, asphalt, and the like.

Plate members 16, 18 may be constructed to any size and thickness necessary for the particular purpose of plate structure 10, and they may include features such as corrugations 42 and holes 44, 45. In one non-limiting embodiment, plate members 16, 18 are constructed of steel with a thickness of about 6 to 8 gauge, where, prior to corrugation and/or bending, plate members 16 are about four to six feet wide ($W_1$) and about seven to nine feet long ($L_1$), and where plate members 18 are about two to four feet wide ($W_2$) and about nine to eleven feet long ($L_2$). Essentially, plate members 16 are "short and wide," and plate members 18 are "long and narrow," relative to each other. Plate members 16, 18 may further include a plurality of corrugations 42 spaced about twelve to eighteen inches apart (trough-to-trough), and about three to eight inches deep (peak to trough). Plate members 16, 18 may also have holes 44, 45 spaced along their respective sides and ends, where holes 44 are positioned in the peaks and troughs of the corrugations 42, and holes 45 are spaced at regular intervals between about twelve and twenty inches apart from each other along the length thereof. In one embodiment, the ends 24, 26, 32, 34 may include a plurality of holes 44 (for example, three), along each peak and trough of each corrugation 42 spaced between about one and five inches apart from each other, lengthwise. The holes 44, 45 may be configured such that when the plate members 16, 18 are assembles as earlier described, the holes 44, 45 align to receive bolts 46 or other suitable fastening mechanisms. Plate members 16, 18 may further include perforations (not shown) to enhance drainage capabilities of plate structure 10.

Plate structures 10 may be configured to form a double-layered structure with a filler such as foam or concrete inserted between the layers to maximize the strength of the double-layered structure. For example a cylindrical double-layered structure may have concentric inner and outer structures with different diameters, where each of the inner and outer structures are plate structures 10, and where foam or concrete filler is placed between the plate structures 10. Similarly, double-layered structures of any shape may be formed with pairs of plate structures 10 that are sized to nest together with an appropriate filler injected between the plate structures 10.

The basic configuration of plate structure 10 having been described, a method for its manufacture will now be disclosed. The described method is articulated with respect to a corrugated metal plate structure with a generally elliptical cross-section as shown in the figures, but one skilled in the art will appreciate that the method disclosed herein may be adapted to manufacture plate structures formed of different materials with different cross-sectional shapes.

First, metal sheets are milled, cut, or otherwise shaped to form a plurality of plate members 16 and a plurality of plate members 18 of the appropriate size in generally flat sheets of generally uniform thickness, where width $W_1$ of each plate member 16 is greater than width $W_2$ of each plate member 18, and length $L_1$ of each plate member 16 is less than length $L_2$ of each plate member. Corrugations 42 are then added using a die, press, or other appropriate method. Holes 44, 45 are bored into the sides and ends of the plate members 16, 18 using a plasma table or other appropriate drilling or boring method. A single press machine may be used to add both the corrugations 42 and the holes 44, 45, in any order. At this point, a plurality of flat (i.e., not curved in the lengthwise direction), corrugated plate members 16 and a plurality of flat (i.e., not curved in the lengthwise direction), corrugated plate members 18 have been formed.

Using a roll mill, a bump-press, a three-roller machine press, manual bump-curling, or other appropriate automated or manual technique or device, each plate member 16, 18 is curved into the appropriate shape for use in forming a plurality of rows 12, 14, ensuring that proper quantity of each type of plate member 16a, 16a', 16b, 18a, 18b, 18W (FIGS. 4 and 5) is prepared in the proportions necessary to construct plate structure 10. With reference to FIG. 4, for each row 12 of the plate structure 10, four plate members 18 are curved to form four plate members 18a, and four plate members 16 are curved in to form two plate members 16a and two plate members 16a', where each plate member 18a, 16a, 16a' is curved to a radius of curvature (e.g., uniform or varying along the length of the member) appropriate for its location within row 12. Similarly, with reference to FIG. 5, for each row 14 of the plate structure 10, four plate members 16 are curved to form four plate members 16b, and four plate members 18 are curved in to form two plate members 18b and two plate members 18W, where each plate member 16b, 18b, 18W is curved to a radius of curvature (e.g., uniform or varying along the length of the member) appropriate for its location within row 14. It should be appreciated that plate structures 10 with other cross-sectional shapes will require different proportions and types of plate members 16, 18.

Once the required plate members 16, 18 are formed and curved, they can be assembled to form plate structure 10. Plate members 16a, 16a', 18a are assembled to form row 12 (FIGS. 2 and 4), where plate members 16a, 16a' and plate members 18a are positioned end-to-end in an alternating fashion with plate members 16a opposite each other to define the major axis of the elliptical cross-section of the row 12 and plate members 16a' likewise opposite from each other to define the minor axis of the elliptical cross-section of the row 12. Ends 32, 34 of plate members 18a overlap ends 24, 26 of plate members 16a, 16a' such that holes 44 of the respective plate members 16a, 16a', 18a, are in alignment. Bolts 46 are then inserted through the aligned holes 44 to connect plate members 16a, 16a', 18a together along widthwise seams 36, resulting in fully-assembled first row 12.

Similarly, plate members 16b, 18b, 18b' are assembled to form row 14 (FIGS. 3 and 5), where plate members 16b and second plate members 18b, 18b' are positioned end-to-end in an alternating fashion with plate members 18b opposite each other to define the major axis of the elliptical cross-section of the row 14 and plate members 18b' likewise opposite from each other to define the minor axis of the elliptical cross-section of the row 14. Ends 32, 34 of plate members 18b, 18b' overlap ends 24, 26 of plate members 16b such that holes 44 of the respective plate members 16b, 18b, 18b' are in alignment. Bolts 46 are then inserted through the aligned holes 44 to connect plate members 16, 18 together along widthwise seams 36, resulting in fully-assembled second row 14.

The plurality of first rows 12 and second rows 14 are assembled to form plate structure 10 (FIGS. 1, 6, and 7). To do so, row 12 and row 14 are positioned side-by-side such that each plate member 16a of row 12 is positioned proximate to a plate member 18b of row 14, each plate member 16a' is positioned proximate to a plate member 18b', and each plate member 18a is positioned proximate to a plate member 16b. These corresponding pairs of plate members 16, 18 are positioned such that one of the sides 28, 30 of each plate member 18 overlaps one of the sides 20, 22 of the corresponding plate member 16 such that holes 45 on the sides 20, 22, 28, 30 of the respective plate members 16, 18 are in alignment. Bolts are then inserted through the aligned holes 45 to connect the plate members 16 of row 12 with the plate members 18 of row 14 and to connect the plate members 18 of row 12 with the plate members 16 of 14 along lengthwise seams 38. Thus, row 12 and row 14 are joined to form a unitary segment of plate structure 10. This process is repeated to cumulatively join each row 12 and row 14 together until a plate structure 10 of the desired size is formed.

It should be appreciated that the assembly steps may be performed in any order. For example, row 12 need not be fully constructed before attachment to row 14, but rather one or more plate members 16a, 18a of row 12 may be attached to the appropriate plate member 16b, 18b of row 14 before row 12 is complete (and, row 14 need not have been complete at the time of attachment, either). Further, plate structure 10 may be assembled at the site of the manufacturing facility, at the site where plate structure 10 is to be installed, or in piecemeal fashion where plate structure 10 is transported to the installation site in a partially-assembled form. In one embodiment, plate members 16, 18 are assembled into rows 12, 14 at the manufacturing facility, and rows 12, 14 are assembled into plate structure 10 at the installation site. In another embodiment, segments of two to four rows 12, 14 are attached to each other at the manufacturing facility to form multiple-row segments, and the multiple-row segments are transported to the installation site for final assembly into plate structure 10.

One skilled in the art will appreciate that the disclosed plate structure 10 and method of manufacture may be adapted to form plate structures 10 that require more than two sizes of plate members 16, 18. For example, rows 12, 14 may each include three or more classes of plate members with differing lengths and/or widths such that the edges 13, 15 of rows 12, 14 form a more complicated interlocking pattern than the above-described alternating step pattern (e.g., plates X-Y-Z-X-Y-Z-... rather than 16-18-16-18-...). And, plate structure 10 may be formed from a repetitive pattern of rows that includes more than two row configurations to complete a cycle (e.g., rows A-B-C-A-B-C-... rather than 12-14-12-14-...).

Thus, the embodiments of this invention shown in the drawings and described above are exemplary of numerous embodiments that may be made within the scope of the appended claims. It is contemplated that numerous other configurations of the corrugated plate metal structure may be created taking advantage of the disclosed approach. In short, it is the applicant's intention that the scope of the patent issuing herefrom be limited only by the scope of the appended claims.

What is claimed is:

1. A plate structure, comprising:
a plurality of first plate members each having lengthwise first and second sides and widthwise first and second ends, each of the plurality of first plate members having a common substantially uniform first width;
a plurality of second plate members each having lengthwise first and second sides and widthwise first and second ends, each of the plurality of second plate members having a common substantially uniform second width, wherein the second width is larger than the first width;
wherein the plurality of first plate members and the plurality of second plate members are interconnected with each other as follows:
at least one first row formed by first plate members and second plate members connected end-to-end in an alternating manner,
at least one second row formed by first plate members and second plate members connected end-to-end in an alternating manner,
the first row and second row connected side-by-side, wherein the sides of the first plate members of the first row are connected to the sides of the second plate members of the second row, and the sides of the second plate members of the first rows are connected to the sides of the first plate members of the second rows;
wherein the first plate members are corrugated plate members including multiple corrugations formed therein, and the second plate members are corrugated plate members including multiple corrugations formed therein.

2. The plate structure of claim 1, wherein:
each of the first corrugated plate members is curved along its length;
each of the second corrugated plate members is curved along its length;
in each of the first rows the first and second sides of each first corrugated plate member have an inward orientation, and the first and second sides of each of the second corrugated plate members have an outward orientation; and
in each of the second rows the first and second sides of each first corrugated plate member have an outward orientation, and the first and second sides of each of the second corrugated plate members have an inward orientation.

3. The plate structure of claim 1, wherein:
each of the first corrugated plate members is curved along its length, wherein one of the first and second sides of each of the first corrugated plate members has an inward orientation and the other of the first and second sides of each of the first corrugated plate members has an outward orientation; and
each of the second corrugated plate members is curved along its length, wherein one of the first and second sides of each of the second corrugated plate members has an inward orientation and the other of the first and second sides of each of the second corrugated plate members has an outward orientation.

4. The plate structure of claim 1, wherein:
each of the first plate members has a plurality of holes along its first and second ends;
each of the second plate members has a plurality of holes along its first and second ends;
the first and second ends of the first plate members and the first and second ends of the second plate members of the first row overlap such that the plurality of holes therein are in alignment to receive a fastener therethrough;
the first and second ends of the first plate members and the first and second ends of the second plate members of the second row overlap such that the plurality of holes therein are in alignment to receive a fastener therethrough; and
the plate structure further comprises a plurality of fasteners received in the aligned pluralities of holes.

5. The plate structure of claim 4, wherein:
each of the first plate members has a second plurality of holes along its first and second sides;
each of the second plate members has a second plurality of holes along its first and second sides;
the first and second sides of the first and second plate members of the first row and the first and second sides of the first and second plate members of the second row overlap such that the plurality of holes therein are in alignment to receive a fastener therethrough; and
the plurality of fasteners is further received in the aligned second pluralities of holes.

6. The plate structure of claim 1, wherein each of the plurality of first plate members has a common substantially uniform first length, wherein each of the plurality of second plate members has a common substantially uniform second length, and wherein the first length is larger than the second length.

7. The plate structure of claim 1, wherein:
the plurality of first plate members comprises a first subset of first plate members and a second subset of first plate members, wherein each of the plurality of first plate members is curved along its length, and wherein the first plate members of the first subset of first plate members have a different curvature from the first plate members of the second subset of first plate members; and
the plurality of second plate members comprises a first subset of second plate members and a second subset of second plate members, wherein each of the plurality of second plate members is curved along its length, and wherein the second plate members of the first subset of second plate members have a different curvature from the second plate members of the second subset of second plate members.

8. The plate structure of claim 1, wherein the first rows and the second rows are connected along a plurality of seams that collectively form soil-tight, water-permeable gaps between the first rows and the second rows.

9. A plate structure, comprising:
a plurality of first plate members each having lengthwise first and second sides and widthwise first and second ends, each of the plurality of first plate members having a common substantially uniform first width;
a plurality of second plate members each having lengthwise first and second sides and widthwise first and second ends, each of the plurality of second plate members having a common substantially uniform second width, wherein the second width is larger than the first width;
wherein the plurality of first plate members and the plurality of second plate members are interconnected with each other as follows:
at least one first row formed by first plate members and second plate members connected end-to-end in an alternating manner, at least one second row formed by first plate members and second plate members connected end-to-end in an alternating manner, the first row and second row connected side-by-side, wherein the sides of the first plate members of the first row are connected to the sides of the second plate members of the second row, and the sides of the second plate members of the first rows are connected to the sides of the first plate members of the second rows;

wherein the first plate members and the second plate members of the first row form a first closed ring, and the first plate members and the second plate members of the second row form a second closed ring.

10. The plate structure of claim 9, wherein the first closed ring and the second closed ring each have elliptical or circular cross-sections.

11. A plate structure, comprising:

a plurality of first plate members each having lengthwise first and second sides and widthwise first and second ends, each of the plurality of first plate members having a common substantially uniform first width;

a plurality of second plate members each having lengthwise first and second sides and widthwise first and second ends, each of the plurality of second plate members having a common substantially uniform second width, wherein the second width is larger than the first width;

wherein the plurality of first plate members and the plurality of second plate members are interconnected with each other as follows:

at least one first row formed by first plate members and second plate members connected end-to-end in an alternating manner, at least one second row formed by first plate members and second plate members connected end-to-end in an alternating manner, the first row and second row connected side-by-side, wherein the sides of the first plate members of the first row are connected to the sides of the second plate members of the second row, and the sides of the second plate members of the first rows are connected to the sides of the first plate members of the second rows;

a plurality of first rows and a plurality of second rows, wherein the first rows and the second rows are connected side-by-side in an alternating manner.

12. A corrugated plate structure comprising:

a plurality of first rows of corrugated plate members, each first row including a first plurality of corrugated plate members connected end-to-end lengthwise, wherein each first row has corrugated plate members of variable widths along its length to define a first edge, wherein the first edge is similarly shaped for each first row;

a plurality of second rows of corrugated plate members, each second row including a second plurality of corrugated plate members connected end-to-end lengthwise, wherein each second row has corrugated plate members of variable widths along its length to define a second edge, wherein the second edge is similarly shaped for each second row;

wherein the first edge and the second edge are complementary in shape; and wherein the first rows and second rows are connected side-by-side along their first and second edges, wherein each of the corrugated plate members of the first plurality of corrugated plate members of the first row is interconnected with one of the corrugated plate members of the second plurality of corrugated plate members of the second row;

wherein the first edge and the second edge each have stepped profiles.

13. The corrugated plate structure of claim 12, wherein the first and second rows each form closed rings.

14. The corrugated plate structure of claim 12, wherein the corrugated plate members of the first plurality of corrugated plate members have variable lengths and the corrugated plate members of the second plurality of corrugated plate members have variable lengths.

15. A method of manufacturing a plate structure comprising:

providing a plurality of first plate members each having lengthwise first and second sides and widthwise first and second ends, each of the plurality of first plate members having a common substantially uniform first width, the first plate members of metal and having multiple lengthwise corrugations formed therein;

providing a plurality of second plate members each having lengthwise first and second sides and widthwise first and second ends, each of the plurality of second plate members having a common substantially uniform second width, wherein the second width is larger than the first width, the second plate members of metal and having multiple lengthwise corrugations formed therein;

connecting the plurality of first plate members and the plurality of second plate members end-to-end in an alternating manner to form a plurality of first rows and a plurality of second rows;

connecting the plurality of first rows and the plurality of second rows side-by-side in an alternating manner, wherein the sides of the first plate members of the first rows are connected to the sides of the second plate members of the second rows, and the sides of the second plate members of the first rows are connected to the sides of the first plate members of the second rows to form the plate structure.

16. The method of claim 15, further comprising:

curving each of the first corrugated plate members along its length, wherein the first corrugated plate members of the first rows are curved in a first direction, and wherein the first corrugated plate members of the second rows are covered in a second direction opposite the first direction;

curving each of the second corrugated plate members along its length, wherein the second corrugated plate members of the first rows are curved in the second direction, and wherein the second corrugated plate members of the second rows are covered in the first direction.

17. The method of claim 15, wherein the first and second rows are arranged such that the plate structure has a generally round, generally elliptical, or generally arched cross-section.

* * * * *